United States Patent [19]

Parent et al.

[11] Patent Number: 5,089,244
[45] Date of Patent: Feb. 18, 1992

[54] PROCESS FOR PREPARING DISILANE BY USING MOLECULAR SIEVES

[75] Inventors: Jean-Claude Parent, Garches; Marie-Hélène Renaudin, Paris, both of France

[73] Assignee: L'Air Liquide, Societe Anonyme Pour L'Etude et L'Exploitation des Procedes Georges Claude, Paris, France

[21] Appl. No.: 587,125

[22] Filed: Sep. 24, 1990

[30] Foreign Application Priority Data

Sep. 22, 1989 [FR] France .................. 89 12478

[51] Int. Cl.$^5$ ............................................. C01B 33/04
[52] U.S. Cl. ........................................... 423/347; 55/75
[58] Field of Search ............ 423/342, 347, 230, 245.1; 55/75

[56] References Cited

U.S. PATENT DOCUMENTS

| | | | |
|---|---|---|---|
| 3,982,912 | 9/1976 | Yatsurugi et al. | 55/35 |
| 4,554,141 | 11/1985 | Scull et al. | 55/75 |
| 4,976,944 | 12/1990 | Pacauro et al. | 423/347 |

FOREIGN PATENT DOCUMENTS

| | | | |
|---|---|---|---|
| 0314542 | 5/1989 | European Pat. Off. | |
| 0150599 | 9/1981 | Fed. Rep. of Germany | 55/75 |
| 0069715 | 4/1983 | Japan | 423/347 |
| 0030711 | 2/1984 | Japan | 423/347 |
| 61-53106 | 3/1986 | Japan | |
| 1101411 | 5/1986 | Japan | 423/347 |
| 2191413 | 8/1987 | Japan | 423/347 |
| 63-25210 | 2/1988 | Japan | |
| 3036835 | 2/1988 | Japan | 423/230 |
| 147815 | 6/1988 | Japan | |

OTHER PUBLICATIONS

Ruthven, "Zeolites as Selective Adsorbents", Chemical Engineering Progress, Feb. 1988, pp. 42-50.
Chemical Abstracts, vol. 66, No. 8, Feb. 20, 1967, p. 3102, Abrege No. 3246w, Columbus, Ohio, U.S.A.; V. Milenko et al.: Ion-Exchange Equilibriums in Molecular Sieve 4A" & Trans. Faraday Soc. 1966, vol. 62, No. 12 pp. 3479-3488.

*Primary Examiner*—Olik Chaudhuri
*Assistant Examiner*—Ken Horton
*Attorney, Agent, or Firm*—Browdy and Neimark

[57] ABSTRACT

Process for preparing disilane, wherein a raw gas including monosilane, disilane, trisilane and impurities such as phosphine, hydrogen sulfide, arsine, disiloxane and higher siloxanes, undergoes a step of separation by distillation for the substantial elimination of the other compounds of silicon, except disiloxane, and the substantial elimination of phosphine, hydrogen sulfide and arsine impurities, wherein a final purification of the disilane takes place by selective adsorption on molecular sieves, in which one is a sieve of type 3 A and which is used for the elimination of the siloxanes and hydrogen sulfide and the other is a sieve of type 4 A for the elimination of phosphine and arsine.

3 Claims, No Drawings

PROCESS FOR PREPARING DISILANE BY USING MOLECULAR SIEVES

BACKGROUND OF INVENTION (a) Field of the Invention

The present invention concerns the preparation of disilane.

(b) Description of Prior Art

Generally, the SiCaAl alloy is reacted with a dilute solution of hydrochloric acid to give a mixture of monosilane, disilane and trisilane, with impurities such as phosphine, hydrogen sulfide, arsine, disiloxane and higher siloxanes, after which the disilane is extracted from the mixture by distillation.

However, the process of distillation does not enable separation of disiloxane from disilane since the vapor tension curves of these two compounds are practically confounded. On the other hand, the distilled disilane still comprises traces of phosphine, hydrogen sulfide, and arsine, with contents in the order of 10 ppm. It is therefore necessary to provide a complementary purification process so as to obtain disilane of satisfactory purity for electronic applications.

For this purpose, it was suggested to use a final separation by adsorption on molecular sieves, but the first studies that the Applicant has carried out have shown that the separation on molecular sieves could lead to a decomposition of disilane when in contact with the sieve, which could result in a loss in the order of 20%, without being successful in achieving a nearly complete elimination of the impurities, so that the final quality of the product does not meet the norms that the electronic industry requires.

SUMMARY OF INVENTION

It is an object of the present invention to provide a nearly complete elimination of the impurities in the final preparation of disilane while minimizing the losses due to decomposition of the disilane, and this object can be achieved by providing a final purification of the disilane by selective adsorption on molecular sieves, one of which is a sieve of type 3 A for elimination of siloxanes and hydrogen sulfide and the other a sieve of type 4 A for elimination of phosphine and arsine and, more particularly, a molecular sieve 4 A for the elimination of phosphine and arsine that has been modified by substitution of the sodium ions with cadmium ions. It is highly preferable, even indispensable, that the siloxanes and hydrogen sulfide be first removed on a molecular sieve of type 3A, then phosphine and arsine on a molecular sieve of type 4A.

The definitions of the molecular sieves 3A and 4A will not be repeated here, it being sufficient to refer to the articles which are specialized in this subject, for example the article entitled "Zeolites as Selective Adsorbents" by Douglas M. Ruthven, Univ. of New Brunswick, Fredericton, N. B. Canada, published in "Chemical Engineering Progress" February 1988, pages 42 to 50, where it is only noted that the molecular sieve 4A generally has sodium ions (Na+). In practice it is the sieve 4A with sodium ions (Na+) which is found on the market and one of the essential merits of the present invention is not only to have selected sieves 3A and 4A for the selective elimination respectively of siloxanes and hydrogen sulfide, on the one hand, of phosphine and arsine on the other hand, but also to have achieved a particularly high selection of the structure and nature of sieve 4A by realizing an at least partial substitution of the sodium ions with cadmium ions which in practice enables achievement of results of satisfactory quality for the electronic industry.

DESCRIPTION OF PREFERRED EMBODIMENTS

The details which follow include an example of application of the invention which concerns the purification of 1 kg of impure disilane whose composition is the following (chromatographic analysis with catharometer):

| | |
|---|---|
| Phosphine | 12 ppm |
| Hydrogen sulfide | 45 ppm |
| Arsine | 2 ppm |
| Disiloxane | 5810 ppm |
| Trisiloxane | 3.5 ppm |
| Disilane | Q.S. |

The purification is carried out on columns having a cross-section of 7.3 cm$^2$.

The height of the bed of sieve 3A (granulometry 1.6 to 2.5 mm) is equal to 110 cm.

The height of the bed of sieve 4A exchanged with cadmium (granulometry 1 to 1.6 mm) is equal to 43 cm.

The charge of sieve 3A is 620 g; that of sieve 4A with cadmium is 260 g.

These sieves are previously activated by heating at 370° C. by flushing with a flow of 150 l/h nitrogen during 3 hours then with a flow of 150 l/h helium during 1 hour. Helium is thereafter removed by pumping. The purification is carried at a temperature of 16° C. under a pressure of 1.3 bars absolute. The average flow is 76 l/h (=200 g/h).

The analysis of the product recovered has given the following results (average composition, considering the analyses carried out on the gas and liquid phases of the receiving bottle):

| | |
|---|---|
| Monosilane | 1.7% |
| Trisilane | 470 ppm |
| Disiloxane | <1 ppm |
| Trisiloxane | <1 ppm |
| Phosphine | <10 ppb |
| Hydrogen sulfide | <20 ppb |
| Arsine | <5 ppb |
| Disilane | Q.S. |

The analysis of the impurities, phosphine, hydrogen sulfide and arsine is carried out by chromatography with a photo-ionization detector (P.I.D.).

The loss of disilane, by adsorption on the molecular sieves amounts to 30 g, or 3% of the initial amount.

On the other hand, the phenomenons of partial decomposition of disilane on the sieves lead to the formation of 1.7% monosilane or 8.5 g.

The total loss of disilane is of the order of 4%.

We claim:

1. A process for preparing substantially purified disilane from a raw gas including monosilane, disilane, trisilane and impurities of phosphine, hydrogen sulfide, arsine, disiloxane and higher siloxanes, comprising: separating by distillation to substantially eliminate compounds of silicon, except disiloxane, and substantially eliminating impurities comprising phosphine, hydrogen sulfide and arsine by selective adsorption on molecular sieves, wherein one sieve is type 3 A and eliminates siloxanes and hydrogen sulfide and another sieve is type 4 A and eliminates phosphine and arsine to provide a substantially purified disilane.

2. The process according to claim 1, wherein molecular sieve 4 A for elimination of phosphine and arsine is modified by substituting cadmium ions for sodium ions.

3. The process according to claim 1, wherein the siloxanes and hydrogen sulfide are first eliminated on a molecular sieve 3 A, and phosphine and arsine are eliminated on molecular sieve 4 A.

* * * * *